(12) United States Patent
Osburn et al.

(10) Patent No.: US 7,866,934 B2
(45) Date of Patent: Jan. 11, 2011

(54) APPARATUS AND METHOD FOR REMOVABLY ATTACHING A LOADING DEVICE TO A VEHICLE

(75) Inventors: David H. Osburn, Frostproof, FL (US); Lee F. Rathbun, Babson Park, FL (US)

(73) Assignee: Petersen Industries, Inc., Lake Wales, FL (US)

( * ) Notice: Subject to any disclaimer, the term of this patent is extended or adjusted under 35 U.S.C. 154(b) by 67 days.

(21) Appl. No.: 11/893,533

(22) Filed: Aug. 16, 2007

(65) Prior Publication Data

US 2009/0047115 A1    Feb. 19, 2009

(51) Int. Cl.
*B60P 1/22* (2006.01)
*B60P 1/54* (2006.01)
*B60P 1/64* (2006.01)

(52) U.S. Cl. .................. 414/494; 414/478; 414/487; 414/500; 414/686

(58) Field of Classification Search .......... 414/563, 414/686, 498, 478, 786, 480, 494, 500, 487, 414/812; 293/118
See application file for complete search history.

(56) References Cited

U.S. PATENT DOCUMENTS

| | | | | | |
|---|---|---|---|---|---|
| 3,049,378 | A | * | 8/1962 | Nelson | 298/14 |
| 3,204,796 | A | * | 9/1965 | Hand | 414/498 |
| 3,857,504 | A | * | 12/1974 | Bausenbach et al. | 414/500 |
| 4,012,069 | A |   | 3/1977 | Carson | |
| 4,455,118 | A | * | 6/1984 | Scharf | 414/494 |
| 4,529,349 | A | * | 7/1985 | Lutz | 414/478 |
| 4,840,532 | A | * | 6/1989 | Galbreath | 414/479 |
| 4,880,346 | A | * | 11/1989 | Brassette | 414/486 |
| 4,934,898 | A | * | 6/1990 | Galbreath | 414/812 |
| 4,986,719 | A | * | 1/1991 | Galbreath | 414/478 |
| 5,066,188 | A | * | 11/1991 | Bush | 414/339 |
| 5,360,311 | A | * | 11/1994 | Lutz et al. | 414/494 |
| 5,601,393 | A | * | 2/1997 | Waldschmitt | 414/498 |
| 5,628,609 | A | * | 5/1997 | Nespor | 414/563 |
| 5,672,042 | A | * | 9/1997 | Bartel | 414/563 |
| 5,722,810 | A | * | 3/1998 | Young et al. | 414/563 |
| 5,725,350 | A | * | 3/1998 | Christenson | 414/491 |
| 5,779,431 | A | * | 7/1998 | Alm et al. | 414/812 |
| 6,139,250 | A | * | 10/2000 | Nolasco | 414/563 |
| 6,431,577 | B1 | * | 8/2002 | Chapman | 280/491.5 |
| 6,447,239 | B2 | * | 9/2002 | Young et al. | 414/563 |
| 6,547,506 | B1 | * | 4/2003 | Jacob | 414/498 |
| 6,631,917 | B1 | * | 10/2003 | Chapman | 280/491.5 |
| 6,641,353 | B2 | * | 11/2003 | Oliver | 414/500 |
| 6,736,585 | B2 | * | 5/2004 | O'Daniel | 414/498 |
| 7,037,062 | B2 | * | 5/2006 | Oliver | 414/478 |
| 7,153,082 | B2 | * | 12/2006 | Nolasco | 414/563 |

(Continued)

Primary Examiner—James Keenan
(74) Attorney, Agent, or Firm—Greer, Burns & Crain, Ltd.

(57) ABSTRACT

A loading device can be mounted quickly and easily to a roll-off vehicle by mounting a yoke assembly to the frame of the roll-off vehicle. The yoke assembly includes a pair of attaching potions which extend from the vehicle, and each of the attaching portions is provided with an opening. A pair of hydraulically actuated hooks are pivotally mounted on the loading device. The loading device is pulled onto the roll-off vehicle so that the hooks are adjacent the attaching portions of the yoke assembly. The hooks are then pivoted to extend through the openings in the attaching portions so that the hooks are secured to the attaching portions.

4 Claims, 8 Drawing Sheets

U.S. PATENT DOCUMENTS

2003/0082037 A1* 5/2003 Khodkov .................... 414/546
2003/0082038 A1* 5/2003 Nolasco ..................... 414/563
2007/1013129    6/2007 Osburn

* cited by examiner

APPARATUS AND METHOD FOR REMOVABLY ATTACHING A LOADING DEVICE TO A VEHICLE

BACKGROUND

This invention relates to roll-off vehicles, and, more particularly, to a loading device which is removably attached to a roll-off vehicle.

A roll-off vehicle is a truck or other vehicle which is designed to load and transport large containers, such as refuse containers. A roll-off vehicle conventionally includes a rail assembly which includes two or more rails and which is pivotally mounted on the vehicle for movement between a horizontal or transport position and an inclined or raised loading or unloading position. A hoist on the rail assembly includes one or more cables which can be connected to a container, e.g., a refuse container, for pulling the container upwardly along the inclined rail assembly. After the container is pulled onto the rails by the cable, the rail assembly is lowered to the transport position. The vehicle can then transport the container.

Petersen Industries, the assignee of this invention, has provided a loading device which can be pulled onto, and be removably mounted on, a roll-off vehicle. The loading device includes a container body and a knuckleboom loader which carries a grapple. Mounting the loading device on the roll-off vehicle permits the vehicle to be used temporarily as a grapple vehicle. After the grapple work has been performed, the loading device can be removed from the vehicle to permit the vehicle to return to its normal use.

In order to perform properly, the loading device must be tied securely, yet removably, to the roll-off vehicle. The attachment mechanism must withstand very high stresses.

The prior art mechanism for attaching a loading device to a roll-off vehicle is complicated and difficult to install. As a result, the attachment mechanisms have been installed on the roll-off vehicles at Petersen Industries' facility. This requires the owner of the roll-off vehicle to send the vehicle to Petersen Industries, and the vehicle is out of service and cannot be used again by the owner until the attachment mechanism is installed and the vehicle is returned.

SUMMARY OF THE INVENTION

The invention provides a novel attachment mechanism and method which is so easy to install that the mechanism can be installed by owners of roll-off vehicles, dealers, and other third parties independently of Petersen Industries. The vehicle is therefore not out of service for any appreciable length of time.

The attachment mechanism includes a yoke assembly which is permanently mounted to the underside of the frame or chassis of the roll-off vehicle. The yoke assembly includes a pair of attaching portions which extend upwardly from the underside of the frame on each side of the frame. Each attaching portion is provided with an opening. The yoke assembly can be readily attached to the vehicle by the owner of the vehicle or some other convenient person, e.g., a local dealer or mechanic.

A pair of hydraulically actuated hooks are pivotally mounted on the loading device, advantageously by the manufacturer of the loading device.

The loading device is pulled onto the inclined rails of the roll-off vehicle in the conventional manner. After the rails are lowered, the hooks are hydraulically actuated to rotate through the openings in the yoke and into engagement with the yoke. The hooks tie the loading device to the roll-off rails and to the frame of the vehicle, and the loading device and the vehicle thereafter effectively function as one unit.

DESCRIPTION OF THE DRAWING

The invention will be explained in conjunction with an illustrative embodiment which is illustrated in the accompanying drawing, in which.

DESCRIPTION OF SPECIFIC EMBODIMENT

Figure 1:
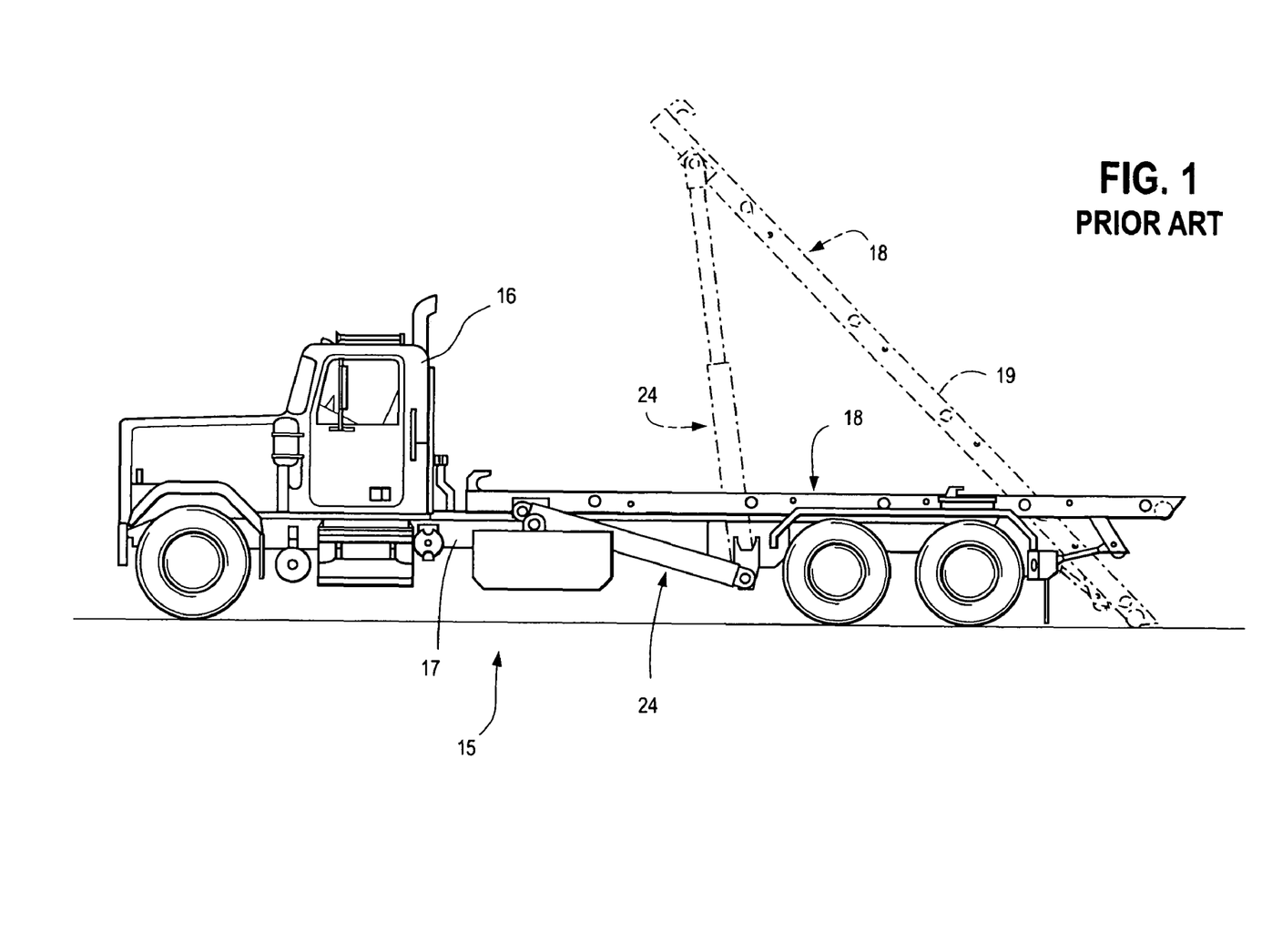
FIG. 1 is a side elevational view of a prior art roll-off vehicle showing the rail assembly in solid outline in the lowered position and in phantom outline in the raised position.
Figure 2:
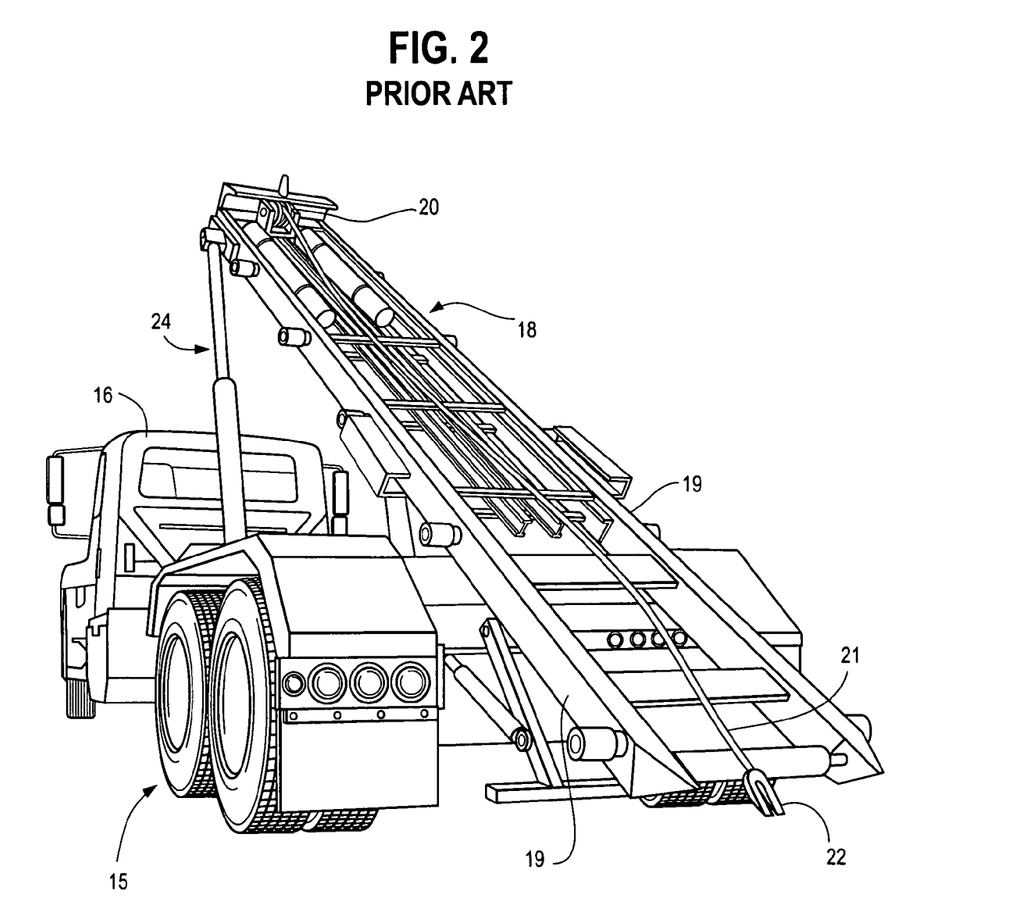
FIG. 2 is a rear perspective view of the roll-off vehicle showing the rail assembly in the raise position.

Referring to FIGS. 1 and 2, a conventional roll-off vehicle 15 includes a truck cab 16, a chassis or frame 17, and a rail assembly 18. As used herein, the term "roll-off vehicle" is used broadly to refer to a vehicle which can pull a container onto the vehicle by means of a cable and from which the container can be rolled off or unloaded. Such roll-off vehicles are well-known to those skilled in the art.

The rail assembly 18 includes two or more rails 19 which are pivotally attached to the truck chassis, a hoist mechanism 20, and one or more cables 21 which can be unwound and wound up by the hoist mechanism. A hook 22 or similar attachment mechanism is attached to the end of the cable.

A pair of hydraulic cylinder and piston assemblies 24 are attached to the truck chassis 17 and to the rail assembly 18 for raising and lowering the rail assembly between a horizontal transport position which is illustrated in solid outline in FIG. 1 and an inclined or raised loading and unloading position which is illustrated in phantom outline in FIG. 1. When the rail assembly is in the loading and unloading position, the rear ends of the rails are adjacent to, or in contact with, the ground or surface which supports the truck.

Figure 3:
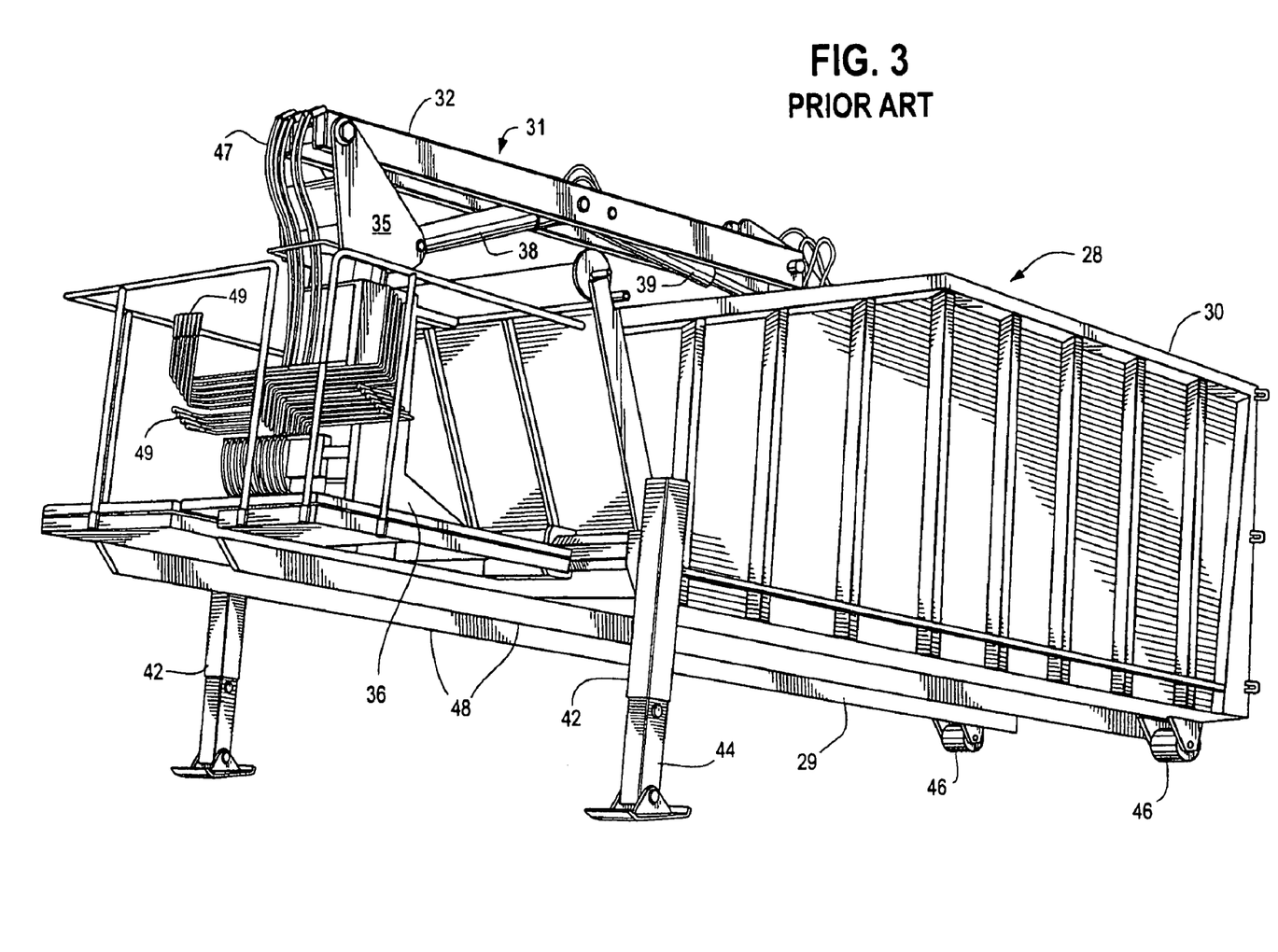
FIG. 3 is a perspective view of a prior art loading device which can be mounted on a roll-off vehicle.
Figures 4, 5:
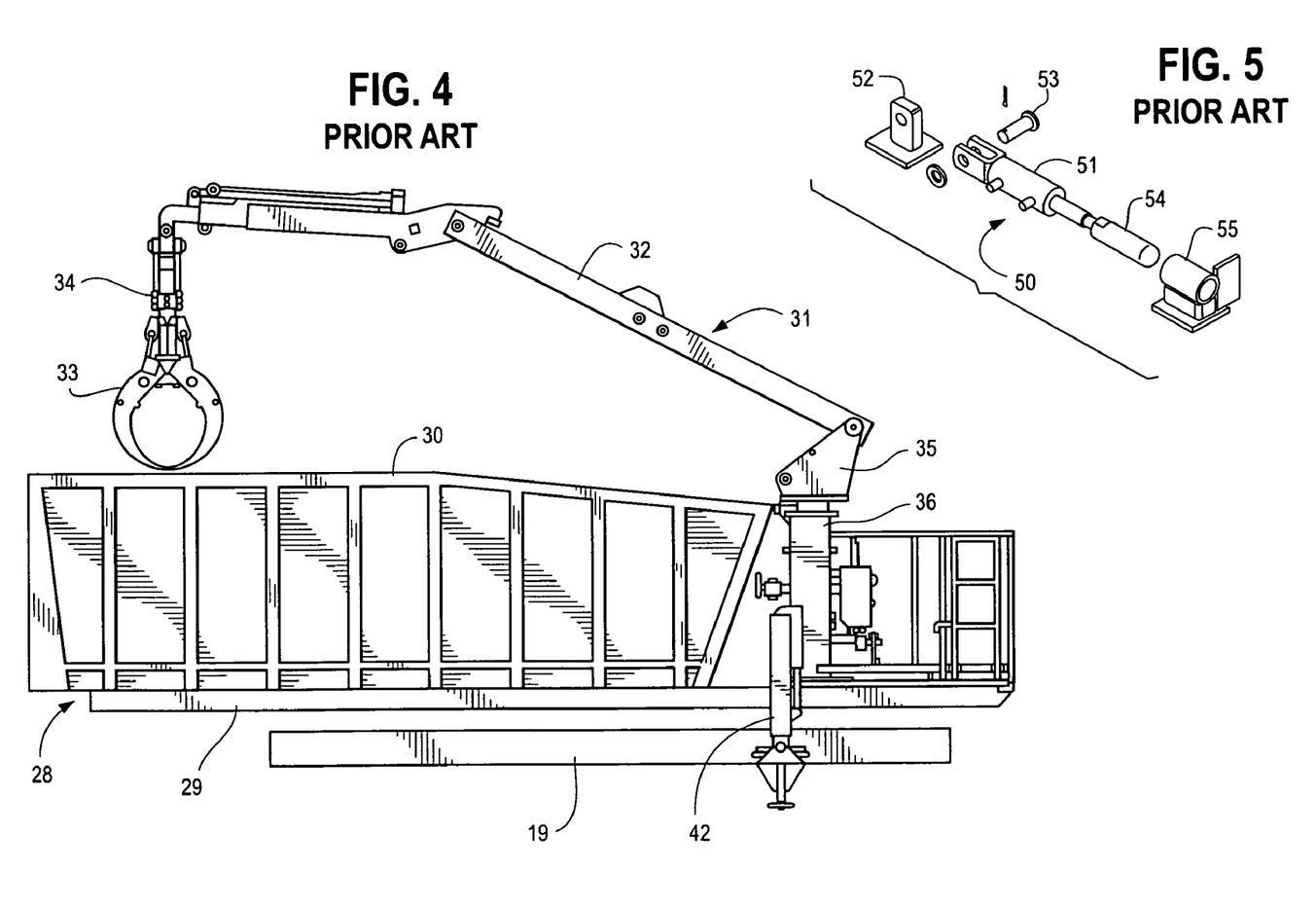
FIG. 4 is a fragmentary side elevational view of the loading device of FIG. 3 mounted on a roll-off vehicle.
FIG. 5 is an exploded perspective view of a prior art mechanism for attaching the loading device of FIG. 4 to the vehicle.

FIG. 3 illustrates a prior art loading device 28 which is adapted to be mounted on the roll-off vehicle 15. The particular loading device illustrated includes a support frame 29, a container 30 which is supported by the frame, and a boom assembly 31 which is supported by the frame. The boom assembly is advantageously of the type which is described in U.S. Pat. No. 4,012,069 and includes a two-part lifting boom 32 and a grapple 33 (FIG. 4). The grapple is connected to the boom by a hydraulically actuated rotary swivel 34. The boom is mounted on a rotating head 35 which is rotatably supported by a pedestal 36 which is mounted on the frame 29. The two parts of the boom 32 are raised and lowered by hydraulic cylinders 38 and 39 (FIG. 3).

A pair of outriggers 42 is mounted on the sides of the loading device for raising the front end of the loading device and for stabilizing the device during use. Each outrigger includes a horizontal telescoping arm 43 and a vertical telescoping arm 44. Hydraulic cylinders are positioned within or adjacent to the horizontal and vertical arms for extending and retracting the arms. A pair of rollers 46 is mounted on the back end of the support frame 29.

The loading device 28 may be operated by lever arms or handles 49 on the device. As described in U.S. Ser. No. 11/301,778, now U.S. Patent Publication No. 2007-0131292-A1, the lever arms operate a plurality of conventional hydraulic actuators which are connected to the hydraulically operated components of the loading device by hydraulic hoses 47. Alternatively, as described in Ser. No. 11/301,778, the hydraulic actuators can be operated by joysticks.

One of the hydraulic actuators slews or rotates the main boom. Other actuators raise and lower the main boom and the tip boom. Another actuator extends and retracts a tip extension boom. Another actuator rotates the rotary swivel 34. Other actuators operate the cylinders and pistons of the outriggers 42. The loading device can include its own hydraulic pump for operating the hydraulic components, or the hydraulic components can be connected to a hydraulic pump on the roll-off vehicle by hydraulic connections.

The loading device 28 is mounted on the roll-off vehicle 15 by backing the vehicle with the raised rail assembly up to the raised loading device of FIG. 3. The cable 21 is attached to the loading device by the hook 22, and the bottom of the loading device is pulled up along the inclined rails 19 by the hoist mechanism 20 which winds up the cable. The frame 29 of the loading device includes a pair of longitudinally extending rails 48 which engage and slide over the roll-off vehicle. After the loading device is pulled onto the rails 19, the rail assembly is lowered to the horizontal transport position as illustrated in FIG. 4.

The prior art loading device 28 is attached to the roll-off vehicle by a pair of hydraulic cylinder and piston assemblies 50 (FIG. 5) which are mounted on the front end of the loading device. A cylinder 51 is pivotally connected to a mounting lug 52 on the frame of the loading device by a pin 53. A piston 54 extends through a cylindrical bushing 55 on the frame. The loading device is attached to the roll-off vehicle by extending each of the pistons 54 through the bushings 55 and into a recess in a stationary locking receptacle on the roll-off vehicle.

FIGS. 6-12 illustrate a loading device 60 which is attached to a pair of rails 61 and 62 of a roll-off vehicle in accordance with the invention. The rails 61 and 62 are part of a conventional roll-off vehicle or truck such as the roll-off vehicle 15 of the frame 17 of a conventional roll-off vehicle or truck such as the roll-off vehicle 15 of FIGS. 1 and 2.

Figure 6:
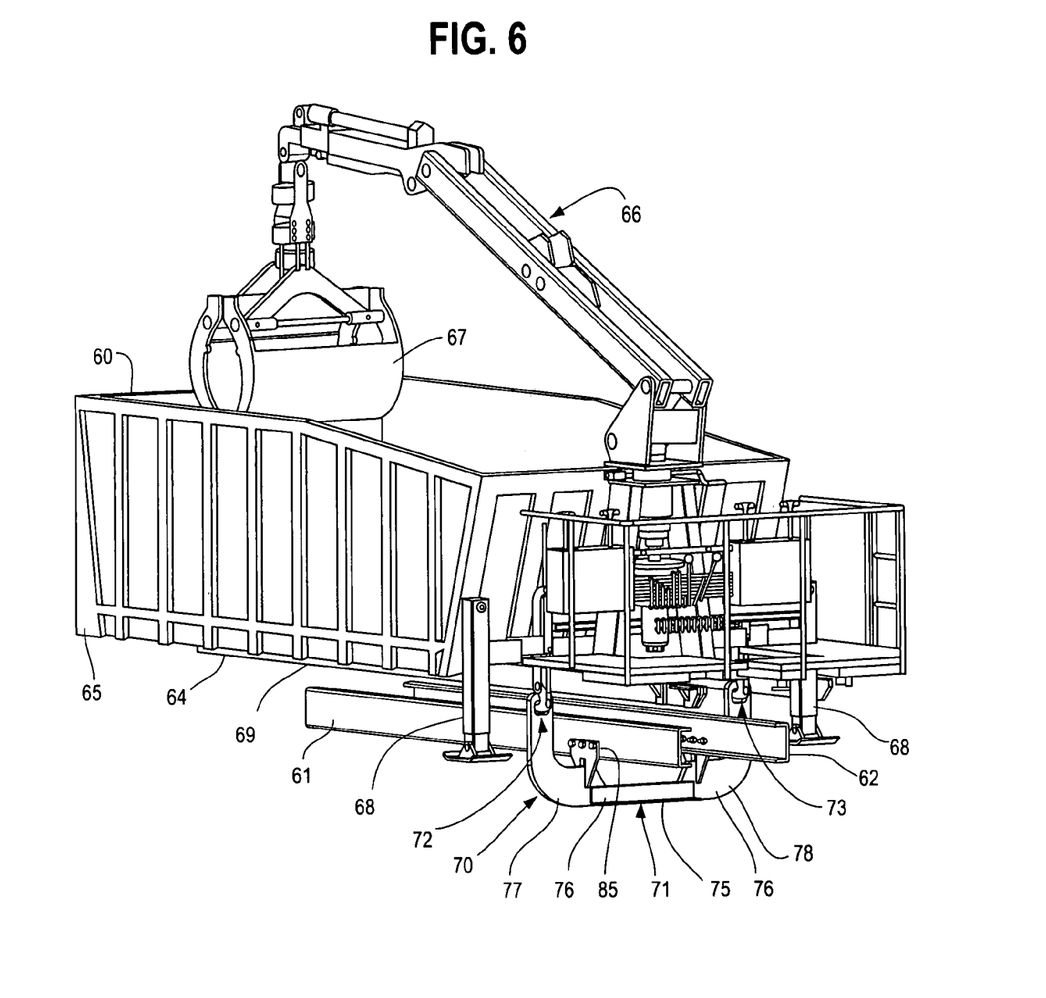
FIG. 6 is a fragmentary perspective view of a loading device mounted on a roll-off vehicle in accordance with the invention.
Figure 7:
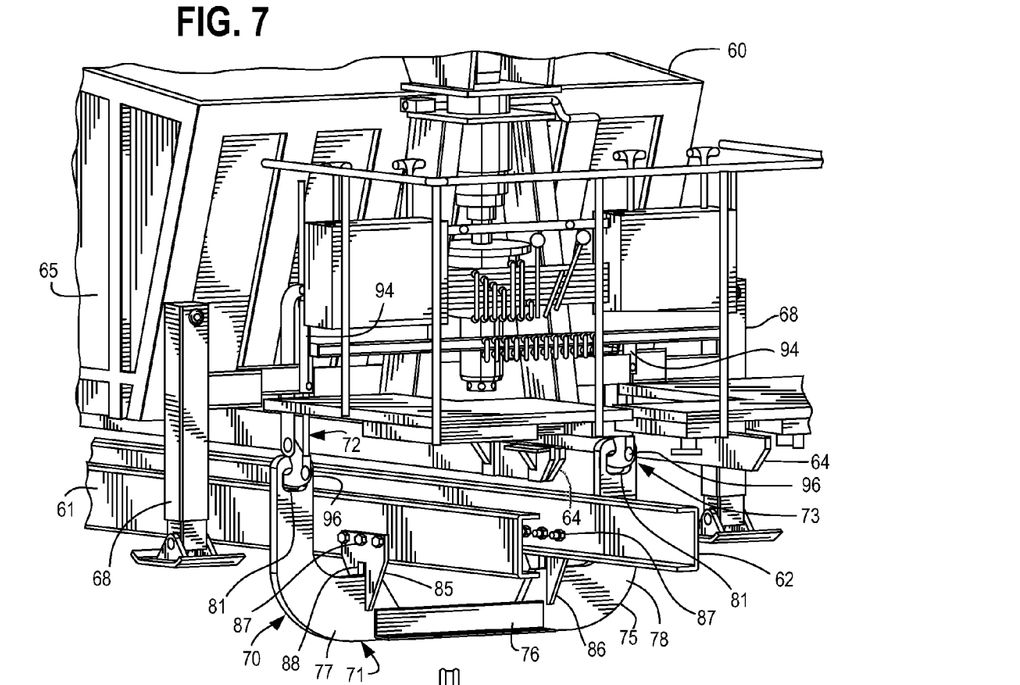
FIG. 7 is an enlarged fragmentary view of FIG. 6.
Figure 8:
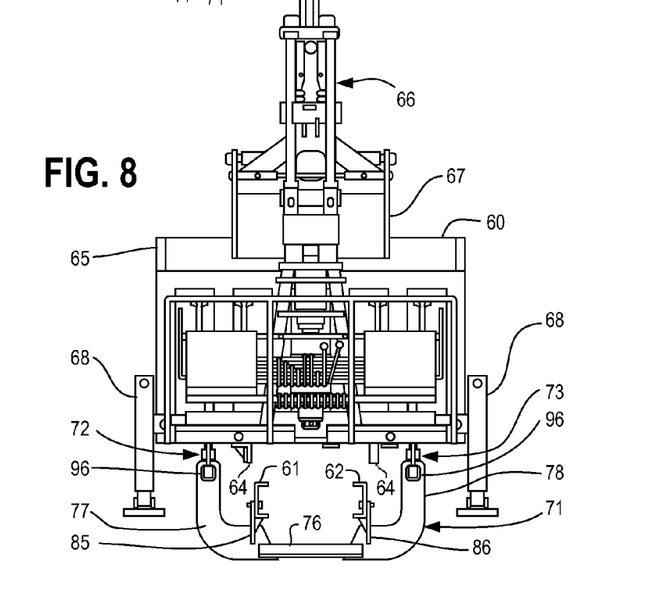
FIG. 8 is an end view of the loading device and roll-off vehicle of FIGS. 6 and 7.

The particular loading device 60 illustrated can be the same as the loading device 28 except for the attachment mechanism. The loading device 28 includes a support frame 64, a container 65, a boom assembly 66 which supports a grapple 67, and outriggers 68. The bottom portion 69 of the support frame 64 is adapted to be pulled along the rails 19 of the roll-off vehicle in the same way as described with respect to the loading device 28.

However, the invention is not limited to the particular loading device which is illustrated. The loading device can be any type of loading device, e.g., a container alone, some type of lifting device such as a boom or crane, or any other device which can be used to load or unload objects onto the vehicle, either alone or in combination.

The loading device 60 is attached to the rails 61 and 62 of the frame 17 of the roll-off vehicle by an attachment assembly 70. The attachment assembly includes a yoke assembly 71 which is attached to the rails and a pair of hydraulically actuated hook assemblies 72 and 73 which are attached to the loading device.

Figure 9:
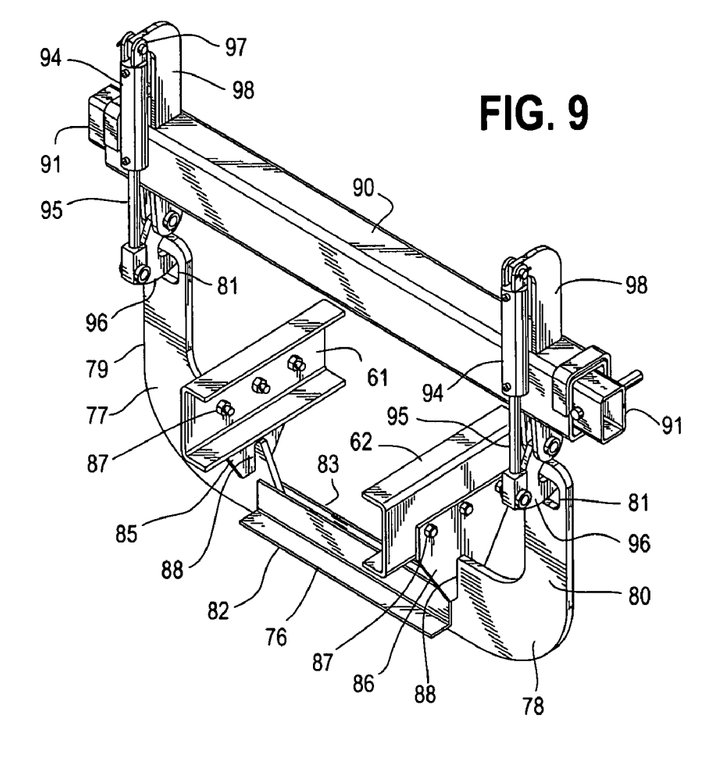
FIG. 9 is a fragmentary perspective view of the attachment mechanism for the loading device and roll-off vehicle of FIGS. 6-8.

The yoke assembly 71 includes a generally U-shaped yoke 75 which includes a horizontal bottom portion 76 which extends below and across the bottom of the rails 61 and 62 and a pair of L-shaped end portions 77 and 78.

Each of the L-shaped end portions is preferably formed from a flat metal plate having a thickness that is dependent on the stresses which each plate will encounter in the application to which the loading device will be put. In one specific embodiment, the plate was one inch thick. Each end portion includes a vertically extending attaching portion 79 and 80 (FIG. 9), respectively, which extends upwardly laterally outwardly of the adjacent rail 61 or 62. The upper end of each attaching portion extends above the top of the rails and is provided with a hook opening 81. In the embodiment illustrated in the drawings, the horizontal bottom portion 76 is formed by a pair of metal angles 82 and 83 (FIGS. 9, 11, and 12) which are welded to the end plates 77 and 78.

The yoke can be formed from one piece, or the bottom portion 76 and the end portions 77 and 78 can be formed separately and joined together by welding or the like to form an integral assembly. In the preferred embodiment the parts are formed separately and are welded together to form an integral assembly.

Figure 11:
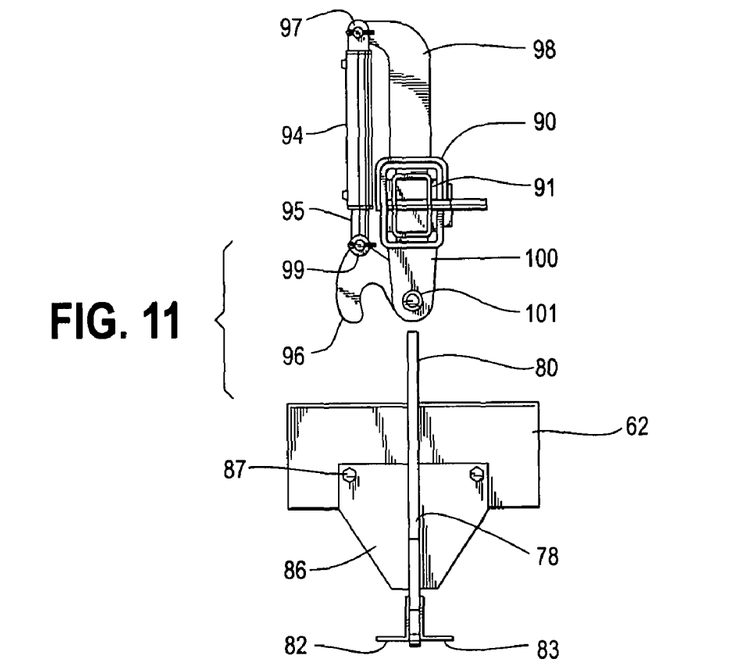
FIG. 11 is a side view showing one of the hook assemblies on the loading device in the unlocked position and the yoke assembly on the roll-off vehicle.
Figure 12:
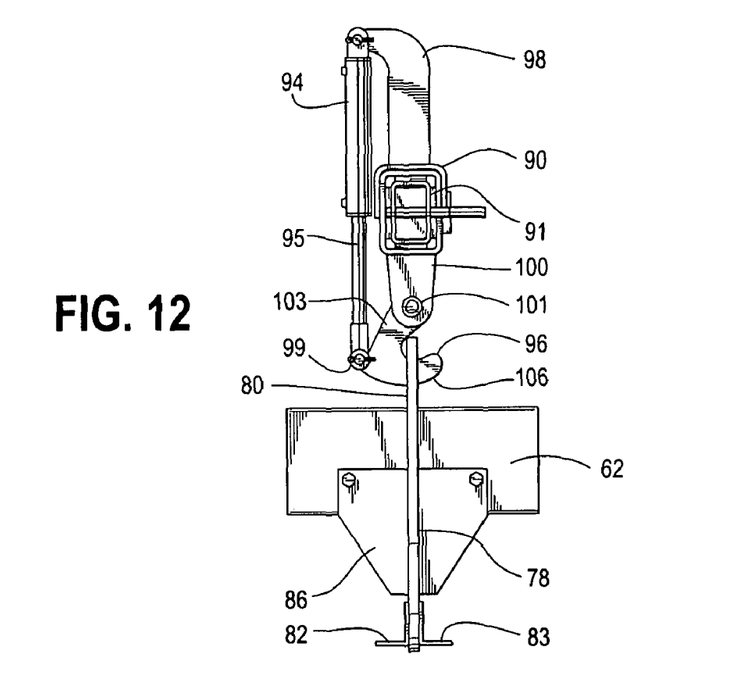
FIG. 12 is a view similar to FIG. 11 showing the hook assembly in the locked position in which it engages the yoke assembly.

Downwardly extending tongues or tabs 85 and 86 are attached to the rails 61 and 62, respectively, by bolts or the like. In the preferred embodiment each tongue is attached to a rail by three bolts 87 (FIGS. 9, 11, and 12). A slot 88 is provided in each tongue. The yoke is attached to the tongues by inserting the flat end portions 77 and 78 into the slots 88 and welding or otherwise securing the end portions to the tongues.

The yoke assembly 71 is relatively simple in construction and can be attached to the rails 61 and 62 relatively quickly and easily. The yoke assembly may be permanently attached to the rails and does not interfere with the normal operation of the roll-off vehicle in loading and unloading containers onto and off of the vehicle. If desired, however, the yoke assembly can be removed from the roll-off vehicle simply by unscrewing the bolts 87 which attach the tongues 85 and 86 to the rails.

The hook assemblies 72 and 73 are attached to a horizontal bar 90 on the loading device 60. In the particular embodiment illustrated, the horizontal bar 90 is the rectangular tube which houses the horizontal telescoping arms 91 (FIG. 9) of the outriggers 68. However, the hook assemblies can be attached to the loading device in any other suitable manner that is able to withstand the stresses.

Figure 10:
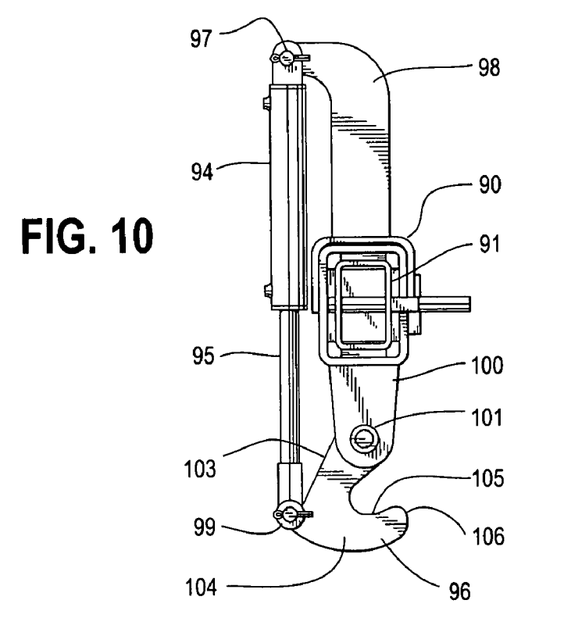
FIG. 10 is a side view of one of the hook assemblies on the loading device.

Referring to FIGS. 10-12, each hook assembly includes a generally vertically extending hydraulic cylinder 94, a piston 95, and a hook 96. The upper end of each cylinder 94 is pivotally connected by a pivot pin 97 to a generally L-shaped support arm 98 which is welded to the top of the bar 90. The piston 95 is pivotally connected to the hook 96 by a pin 99, and the hook is pivotally connected to a pair of clevis plates 100 by a pin 101. The clevis plates 100 are attached to the bar 90 and extend downwardly therefrom. Each hook includes a relatively straight pivot portion 103 and a curved, generally C-shaped latching portion 104 (FIG. 10) which includes a curved inside surface 105 and a curved end portion 106.

FIG. 11 illustrates the relative positions of the hook assemblies 72 and 73 and yoke assembly 71 when the loading device 60 has been pulled onto the rails 61 and 62 of the roll-off vehicle and the rails have been lowered to the horizontal transport position. The pivot pins 101 of the hook assemblies are generally vertically aligned with the attaching portions 79 and 80 of the end portions 77 and 78 of the yoke. Either the roll-off vehicle or the loading device, or both, is advantageously provided with a stop so that further sliding movement of the loading device relative to the vehicle is prevented when the hook assemblies are aligned with the yoke.

FIG. 11 illustrates the hook assemblies in the unlocked positions. The pistons 95 are retracted within the cylinders 94, and the hooks 96 are above the attaching portions 79 and 80 of the yoke.

Pressurized hydraulic fluid is supplied to the cylinders 94 to move the pistons and hooks to the locked position illustrated in FIG. 12. As the pistons extend, the hooks 96 pivot about the pivot pins 101, and the end portions 106 of the hooks extend through the openings 81 in the attaching portions 79 and 80 of the yoke. In the embodiment illustrated in the drawing, each of the openings 81 is surrounded by the attaching portion 79 or 80. However, the opening could also be formed by a notch which extends inwardly from the side of the attaching portion.

In the locked position illustrated in FIG. 12, the curved end portion 106 of each hook extends upwardly beyond the top edge of the associated opening 81, and the inside surface 105 of the latching portion 104 engages, or is closely adjacent to, the top edge of the opening 81. The upper ends of the end portions 77 and 78 of the yoke are therefore tightly confined between the pivot portions 103 and the end portions 106 of the hooks. If desired, the hooks can be pivoted by the hydraulic cylinders so that the curved inside surfaces 105 of the hooks forcibly engage the top edges of the openings 81.

The loading device is thereby tightly connected to the roll-off vehicle, and little relative movement between them is permitted. The loading device can be transported by the roll-off vehicle, and the boom assembly 66 and grapple 67 can be operated to load and unload material into and from the container 65.

If the loading device is not equipped with its own hydraulic motor, the hydraulic hoses of the loading device can be connected to the hydraulic motor of the roll-off vehicle's hydraulic hoist or, preferably, to a separate hydraulic motor mounted to and powered by the roll-off vehicle's engine after the loading device is pulled onto the rails and the rails are lowered to the horizontal position. The hydraulic motor on the roll-off vehicle can then be used to supply pressurized hydraulic fluid to the cylinders 94 to operate the hooks and to supply pressurized hydraulic fluid to operate the boom assembly 66.

When the loading device is no longer needed, the loading device can be detached from the roll-off vehicle by following the reverse procedure. The pistons 95 are retracted to unlock the hooks 96 from the yoke, the rails 61 and 62 are raised to an inclined position, and the hoist assembly of the roll-off vehicle is operated to unwind the cable and allow the loading device to slide down the rails.

While in the foregoing specification a detailed description of a specific embodiment of the invention has been set forth, it will be understood that many of the details herein described can be varied considerably without departing from the spirit and scope of the invention.

We claim:

1. In combination, a roll-off vehicle and a loading device removably attached to the roll-off vehicle, the roll-off vehicle including a main frame, a pivotable rail assembly mounted on the main frame, a cable assembly for pulling said loading device along the rail assembly along a first axis, and a yoke assembly including a mounting portion which extends under and is attached to the vehicle main frame and a pair of attaching portions which extend upwardly from the mounting portion, the loading device including a container, a boom assembly and a hydraulic outrigger on each of opposite sides of the boom assembly, the loading device having a bottom portion which is adapted to be pulled along the pivotable rail assembly of the roll-off vehicle and a pair of attachment mechanisms which are engageable with the attaching portions of the yoke assembly whereby the loading device is removably attached to the roll-off vehicle, and each of the attaching portions of the yoke assembly being provided with an opening and each of said attachment mechanisms including a hydraulically operated hook which is movable into said opening in one of the attaching portions of the yoke assembly for removably attaching the loading device to the roll-off vehicle.

2. The structure of claim 1 in which the yoke assembly is integral and generally U-shaped.

3. The structure of claim 1 wherein each hook is pivotally mounted on the container for movement in a direction parallel to said first axis between an unlocked position and a locked position in which the hook extends through the opening in one of the attaching portions of the yoke assembly and a hydraulic cylinder and piston assembly attached to each hook and to the loading device for pivoting the hook between the unlocked and locked positions.

4. The structure of claim 1 in which said main frame of the roll-off vehicle includes a pair of sides and the loading device includes a pair of sides, each of the attaching portions of the yoke assembly being positioned adjacent one of the sides of the frame and one of the sides of the loading device, each of the attachment mechanisms being mounted adjacent one of the sides of the loading device.

* * * * *

UNITED STATES PATENT AND TRADEMARK OFFICE
CERTIFICATE OF CORRECTION

| | | |
|---|---|---|
| PATENT NO. | : 7,866,934 B2 | Page 1 of 1 |
| APPLICATION NO. | : 11/893533 | |
| DATED | : January 11, 2011 | |
| INVENTOR(S) | : David H. Osburn et al. | |

It is certified that error appears in the above-identified patent and that said Letters Patent is hereby corrected as shown below:

Col. 3, line 59   After "are part of" insert --the frame 17 of--.

Signed and Sealed this
Sixth Day of December, 2011

David J. Kappos
*Director of the United States Patent and Trademark Office*